(12) United States Patent
  Clark

(10) Patent No.: US 10,243,377 B2
(45) Date of Patent: *Mar. 26, 2019

(54) PORTABLE MULTIPLE MOBILE ELECTRONIC DEVICE CHARGING STATION

(71) Applicant: Kenneth E. Clark, Celebration, FL (US)

(72) Inventor: Kenneth E. Clark, Celebration, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/462,138

(22) Filed: Mar. 17, 2017

(65) Prior Publication Data

US 2017/0256965 A1 Sep. 7, 2017

Related U.S. Application Data

(63) Continuation-in-part of application No. 15/363,124, filed on Nov. 29, 2016, now Pat. No. 10,003,204, which is a continuation-in-part of application No. 13/998,785, filed on Dec. 9, 2013, now Pat. No. 9,509,153.

(51) Int. Cl.
  *H02J 7/00* (2006.01)
  *H01R 24/64* (2011.01)
  *H01R 24/66* (2011.01)
  *H01R 107/00* (2006.01)

(52) U.S. Cl.
  CPC ............ *H02J 7/0027* (2013.01); *H01R 24/64* (2013.01); *H01R 24/66* (2013.01); *H02J 7/0014* (2013.01); *H02J 7/0042* (2013.01); *H02J 7/0045* (2013.01); *H02J 7/0054* (2013.01); *H01R 2107/00* (2013.01); *H02J 7/0055* (2013.01); *H02J 2007/0062* (2013.01)

(58) Field of Classification Search
  CPC ....... Y02E 60/12; H02J 7/0054; H02J 7/1423; H01M 10/44; H01M 10/46
  USPC ......................................................... 320/103
  See application file for complete search history.

(56) References Cited

U.S. PATENT DOCUMENTS

| | | | |
|---|---|---|---|
| 6,337,558 B1 * | 1/2002 | Yuen | H02J 7/0045 320/107 |
| 2003/0142817 A1 * | 7/2003 | Liao | H02J 7/0054 379/428.01 |
| 2009/0108802 A1 * | 4/2009 | Wu | H01M 10/425 320/103 |

(Continued)

*Primary Examiner* — Arun C Williams

(57) ABSTRACT

A portable charging station for multiple mobile electronic devices comprising a rectangular shaped housing, one or more removable battery packs, a main charging board, a plurality of cord housing cartridges and a faceplate. The main charging board is configured as a charge and cell balancing circuit board located within the housing, the circuit board comprising a plurality of USB ports, and connected to the one or more removable battery packs. The plurality of cord housing cartridges comprising retractable charging cords, each of the retractable charging cords having a USB connector end for connecting to the charge and cell balancing circuit board, and a device connector end for connecting to a mobile electronic device. The faceplate is configured with one or more USB ports for receiving a USB-enabled charging cord, and a plurality of openings from which device connector ends protrude from beneath the faceplate.

10 Claims, 11 Drawing Sheets

(56) References Cited

U.S. PATENT DOCUMENTS

| | | | |
|---|---|---|---|
| 2010/0327805 A1* | 12/2010 | Brandon, II | H02J 7/0003 320/108 |
| 2013/0043827 A1* | 2/2013 | Weinstein | H02J 7/0027 320/103 |
| 2013/0320913 A1* | 12/2013 | Chen | H02J 7/0042 320/103 |

* cited by examiner

PORTABLE MULTIPLE MOBILE ELECTRONIC DEVICE CHARGING STATION

CROSS-REFERENCE TO RELATED APPLICATIONS

This application is a continuation-in-part of earlier filed U.S. application Ser. No. 15/363,124, filed on Nov. 29, 2016, which is in turn a continuation-in-part of earlier filed U.S. application Ser. No. 13/998,785, filed on Dec. 9, 2013, the contents of which are hereby incorporated by reference in their entireties.

BACKGROUND TO THE INVENTION

Current mobile phones use more battery power for all of the applications and the battery life of the phone is depleted rapidly causing the need to recharge the device more often. Typically a person does not carry a charging device with them and if so they do not have access to a power outlet. The present invention for charging mobile phones in public places will offer a much needed convenience. The advertising space offers businesses an incentive to offer the convenience.

SUMMARY OF THE INVENTION

The present invention relates to a portable multiple mobile electronic device charging station (also referred to herein, for simplicity, as "charging station") for charging multiple portable electronic devices, e.g. up to eight mobile devices in public places, where the charging station may also provide space for advertising. The charging station comprises a plurality of device charging cables configured to enable charging of connected electronic devices from the charging station simultaneously, at up to 5 $V_{DC}$ per device.

In one embodiment, the invention provides a portable charging station for multiple mobile electronic devices comprising a rectangular shaped housing with an optional flip lid, one or more battery packs that may be removable and/or rechargeable, a main charging board, a plurality of cord cartridges housing device charge cords, and a faceplate. The main charging board is configured as a charge and cell balancing circuit board located within the housing, the circuit board comprising a plurality of USB ports, in turn connected to the one or more battery packs. The plurality of cord housing cartridges house retractable charging cords, each of the retractable charging cords having a USB connector end for connecting to the charge and cell balancing circuit board, and a device connector end for connecting to a mobile electronic device. The faceplate may be configured with one or more openings accessing one or more USB ports, which in turn may engage a USB-enabled charging cord. The faceplate is further configured with a plurality of openings from which device connector ends of charging cords may protrude from the interior of the housing.

In one embodiment, the one or more battery packs may be removable and/or rechargeable. Each battery pack may comprise a total capacity of at least 10 Ah and generally not more than 40 Ah, although capacity is not limiting. The one or more battery packs may comprise a total capacity of about 20 Ah. For example, each battery pack may comprise a capacity of at least 5 Ah and not more than 20 Ah, e.g. each battery pack may comprise a capacity of about 10 Ah. The one or more battery packs may comprise an output, collectively or individually, of about 5V/2 A to about 5V/8 A. For example, the one or more (e.g. 2) battery packs may comprise an output, collectively or individually, of about 5V/4 A.

In another embodiment, the one or more battery packs comprise a primary battery pack and a secondary battery pack (and optionally a tertiary battery pack). Where the portable charging station comprises a primary and a secondary battery pack, the portable charging station may be further configured with a control mechanism that causes the power source to select current flow from one of the primary battery pack or the secondary battery pack to the charging board. Where the portable charging station comprises a primary, a secondary and a tertiary battery pack, the portable charging station may be further configured with a control mechanism that causes the power source to select current flow from one (or two) of the primary, secondary or tertiary battery pack to the charging board.

In another embodiment, the charging station may be configured to permit recharging of the one or more removable battery packs in situ by the application of an external voltage through a charging port located in the housing. In addition or alternatively, the one or more removable battery packs may be removed from the portable changing station and charged externally.

In one embodiment, each of the cord housing cartridges comprise an enclosed casing configured with an (interior) cord spool mechanism for retracting cords used for charging mobile devices comprising: a single-sided spool comprising one of the retractable charging cords windably attached thereto, wherein the device connector end of the retractable charging cord is extendable from the spool for a distance of up to four feet, and is retractable. In another embodiment, the device connector end of the retractable charging cord may be extendable from the spool for a distance of up to three feet or up to two feet. Providing each of the cord housing cartridges as an individual enclosed casing provides a number of advantages. For example, the design allows each cord housing to be individually removed and replaced in the charging station in a straightforward manner. This may be done by removing the faceplate and then unplugging the USB connector of the relevant cord housing cartridge from the charge and cell balancing board, removing the relevant cord housing cartridge, inserting a replacement cord housing in its place and replacing the faceplate. This means that it is straightforward and economical to replace damaged charging cords and damaged or obsolete device connector ends.

The portable charging station may further comprise one or more access panels in the housing. Each of the one or more access panels may be configured to permit insertion and/or removal of at least one of the one or more removable battery packs through the housing. This provides a straightforward way to replace depleted removable battery packs at the end of their life. It also permits removal of rechargeable battery packs, allowing them to be charged externally. A portable charging station comprising one or more access panels in the housing may also comprise an access panel cover configured to cover a corresponding access panel. A portable charging station comprising one or more access panels in the housing may also comprise a corresponding access panel cover for each of the access panels.

The portable charging station may be further configured with one or more waterproof seals to provide a waterproof container when the lid is closed. The one or more waterproof seals may comprise at least one waterproof seal between the housing and the flip lid. Where the portable charging station comprises one or more access panels in the housing, the one or more waterproof seals may comprise at least one waterproof seal between the housing and the flip lid and at least one waterproof seal between the housing and each access panel cover. Where the portable charging station comprises an access panel along the bottom side of the housing, the one or more waterproof seals may comprise at least one waterproof seal between the housing and the access panel cover and/or along the bottom side of the housing.

In one embodiment, the charging station is configured with a protective outer layer surrounding all or a portion of the housing body, to protect the charging station from the elements, mishandling, and/or other mistreatment, e.g., protected from dirt, dust, water, shock, and the like. In one embodiment, the protective layer may be formed of a single element that wraps around the sides and/or bottom of the housing, or may be composed of separate elements. In certain embodiments, the protective layer is comprised of a rigid or semi-rigid material, such as polycarbonate, and/or of a flexible or semi-flexible material such as TPE, silicone, polypropylene, or other such rubber material, or combinations thereof. In one embodiment, the protective layer may completely cover the side surfaces of the charging station when the housing is encased within the protective layer, however, in some embodiments, the protective layer may cover less than the entire charging station surfaces, such as covering only a perimeter portion of the housing, thereby leaving any interactive touch portion or display panel freely visibly and accessible and uncovered. In another embodiment, the portable charging station may comprise at least one advertising message placed as a wrap, adhesive, and/or silk screening on the exterior of the housing (and/or lid) of the charging station. In another embodiment, the portable charging station may comprise at least one advertising message placed as a wrap, adhesive, and/or silk screening on the exterior of the protective outer layer encasing the charging station.

The portable charging station may further comprise a display panel. The display panel may be located on the front or a side panel of the housing. The display indicator may be configured to display operating status information, such as battery charge level and/or power status. The display panel may be configured as an interactive touch screen, or with one or more controls for controlling one or more functions of the charging station, such as power, batter selection, a timer function, communication means such as Wi-Fi or Bluetooth.

The portable charging station may comprise an internal divider plate located within the housing. The internal divider plate may be attached to at least a portion of at least one side wall of the housing and bisect the inner chamber of the housing into a first inner chamber and a second inner chamber. The first inner chamber comprises the main charging board, the plurality of cord housing cartridges and (where the charging station comprises at least two removable battery packs) optionally at least one of the one or more removable battery packs. The second inner chamber may comprise at least one of the one or more removable battery packs.

In an embodiment, the invention provides a method of charging a mobile electronic device, comprising connecting the mobile electronic device to a device connector end of a retractable charging cord of a portable charging station of the device of the invention, for example as described herein, and/or as embodied by the figures.

DETAILED DESCRIPTION OF THE INVENTION

Figure 1:
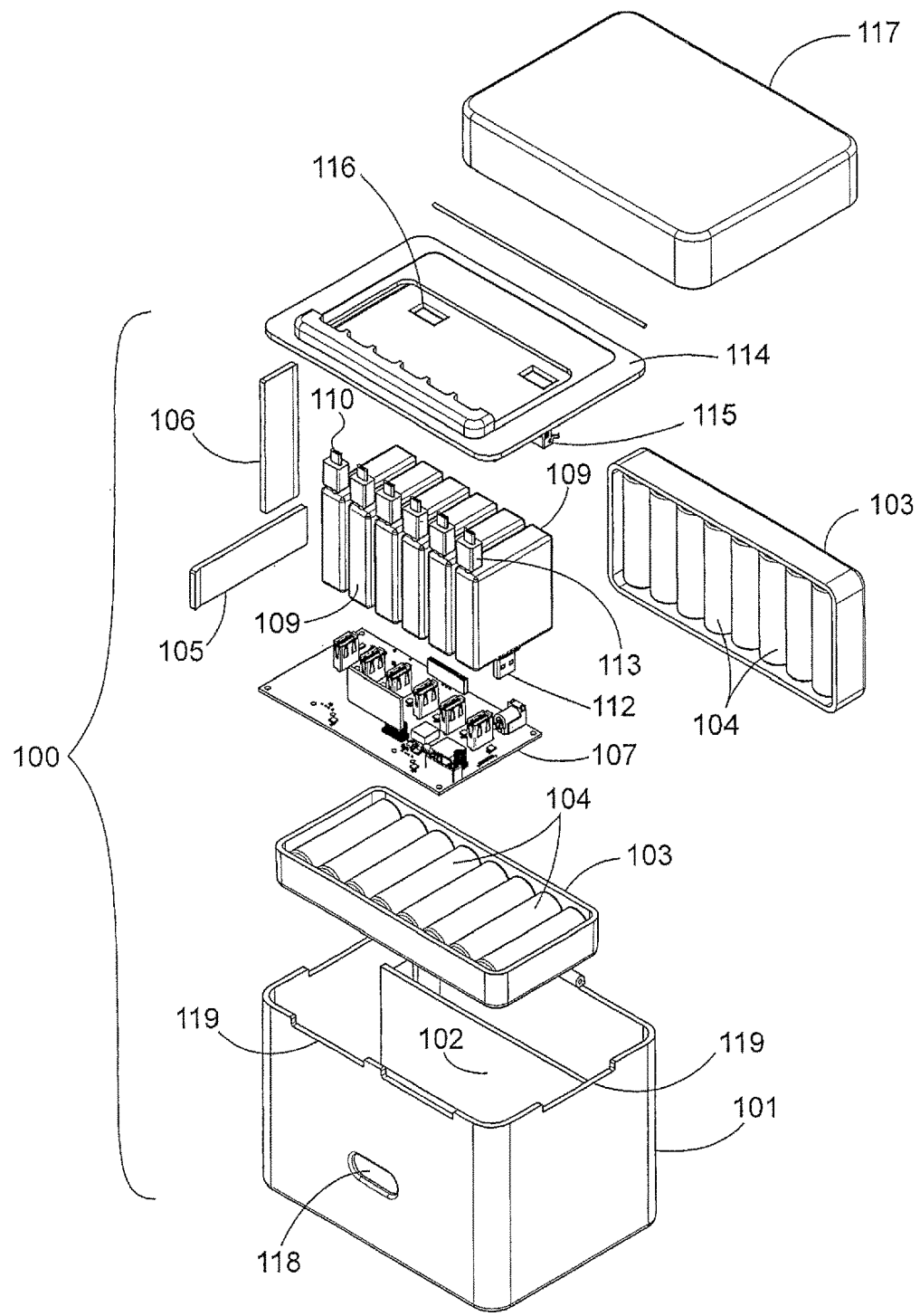
FIG. 1 shows an exploded view diagram showing a charging station according to one embodiment of the present invention.

Described herein is a portable multiple mobile electronic device charging station comprising a housing; one or more battery packs comprising rechargeable battery cells; a main charging board configured for coupling to the one or more battery packs and plurality of charge cords, wherein the charging board is configured as a charge and cell balancing circuit board and is connected to a plurality of cord cartridges housing retractable charging cords adapted at one end for connection to a mobile device; and a faceplate configured with interface ports, wherein the charging station enables charging of one or more connected mobile electronic devices simultaneously. In one embodiment, the charging station further comprises a power on/off switch, and a display configured to display, such as on the front or side panel of the charging station, operating status information, such as battery charge level and/or power status. In another embodiment, the charging station comprises a removable protective outer layer that encases all or a portion of charging station housing to protect charging station from damage.

Depending on the number of charging cartridges configured within the portable charging station, the charging station is capable of providing a full charge for up to eight (or more) mobile devices simultaneously, or individually, providing convenient mobile charging of portable electronic devices at public places. For example, the charging station may provide a full charge for up to 2, 3, 4, 6, 7, 8 or 10 mobile devices. Suitable mobile devices include mobile phones and tablet devices, although in principle any device using a similar charging interface may be charged using a charging station of the invention. Examples of devices include, but are not limited to, mobile telephones (e.g. iphones, android phones, blackberries) tablets (e.g. ipads), laptop computers, wearable devices, and other similar devices as they may be designed.

In one embodiment, the charging station is configured with one or more battery packs comprising 1, 2, 3, 4, 5 or 6 removable and/or rechargeable battery packs. For example, the one or more battery packs may comprise more than one removable and/or rechargeable battery packs comprising battery cells or plurality of battery cells. The provision of more than one removable battery packs may be advantageous, for example when one removable battery pack is removed (e.g. for recharging and/or replacement), the remaining battery pack or battery packs remain in situ, permitting the charging station to continue charging any attached mobile devices from the power reserve of the remaining battery pack or battery packs. Multiple battery packs also permit expansion on high traffic tables, with charge rate verification of each channel set at a nominal 750 mA charge rate to improve charge experience and maximize battery capacity. In one embodiment, a battery may be a 12-volt battery, for example a 12-volt lithium ion battery. In another embodiment, a battery may have a capacity of 10000-30000 mAh, e.g. a capacity of about 20000 mAh. In yet another embodiment, the battery may have an input of about 5 V/2 A and an output of 5 V/4 A.

In one embodiment, the charging station is configured with a plurality of charge cord cartridges. A charge cartridge comprises a charge rate verification for each charging cartridge comprising a 750 mA charge rate. In one embodiment, an overall capacity ranges from 10000 to 30000 mAh capacity, such as 20000 mAh.

The charging station housing is approximately cuboid, e.g. a rectangular cuboid or cube shaped, comprising 4 side walls, a bottom side, and a top side comprising an interface plate. The four side walls and bottom side may be formed together as a single housing with inseparable parts, in other embodiment, the bottom side comprising a planar member affixed with attachment means is reversibly attached to the housing, thereby permitting access to the interior of the housing by removal of the bottom side. Alternatively, the four side walls of housing and top side comprising an interface plate are formed together as a single housing with inseparable parts, and may be reversibly attached to the bottom side. In one illustrative embodiment, the housing may have as overall dimensions, a length of 10-18 cm (e.g. 14.7 cm), height of 10-16 cm (e.g. 12.4 cm) and width of 10-18 cm (e.g. 11 cm), although alternate overall dimensions are possible. For example, a more compact design comprises a shorter length and width, or a larger design comprises a longer length and width, with the prerequisite design being a generally rectangular shape and a size permitting portability.

In one embodiment, charging station and its main components may be made of rigid, semi-rigid materials or flexible materials, such as plastics, resins, rubber, metals, such as steel or stainless steel, or other natural or synthetic materials commonly used in consumer electronics products. In one embodiment, the charging station comprises one or more seals, or combination of seal materials, in order to provide water resistance.

The charging station comprises a housing, one or more batteries or battery packs arranged within the housing, a main charging board located within the housing and a plurality of charge cartridges comprising windable and retractable charging cords, the charge cartridges coupled to (connected-to for transfer of power) the main charging board. The charging station is configured to enable charging of multiple mobile devices from the charging station simultaneously.

In one embodiment, to a top surface of charging board are mounted solid state devices and connectors comprising power discretes and/or passives comprising a voltage regulation circuit. In one embodiment, connectors are configured for reversible coupling to rechargeable battery packs, in another embodiment, the connectors are configured for connection to a standard AC plug adapter, to allow charging of devices in the absence of batteries, or if batteries are depleted of charge as a back-up power source. In one embodiment, the charging board is configured for connection with charging cartridges via a USB connection between the USB connector end of the cartridge and the USB port of charging board. In another embodiment, charging board is also configured for connection to USB ports aligned with interface plate of the housing. In another embodiment, a control mechanism controls the selection of power to the device from a particular battery pack, such as a primary battery pack or secondary (reserve battery pack), to better manage capacity.

When a state of low power is detected to charge devices, or power drops below a minimum threshold for the charging station, a control mechanism associated with the power source then controls the engagement of the reserve battery pack, and the charge board circuit is switched, so that instead of drawing power from the primary battery pack, the circuit is switched to the secondary battery pack, whereby current is then drawn from the reserve battery pack, in order to maintain adequate threshold power levels to charge devices. This allows the primary battery pack to be removed from the charging station to be recharged or replaced, without disrupting the flow of power to connected devices. It will be understood by one skilled in the art that the charging current may be balanced in one of several ways from or among one or both battery packs, and that the embodiment described is merely one example of such an arrangement.

In another embodiment, the charging station is configured for remote operation, such as a power on and power off feature via wireless communication between a remote control and the charging station, for turning the unit from an inactive state to an active state, and vice versa, in order to conserve battery power. In yet another embodiment, the charging station is configured with a stand-by mode. Turning now to the Figures, where are shown a portable multiple mobile electronic device charging station according to various embodiments of the invention.

FIG. 1 represents a portable charging station 100 according to one embodiment of the invention. The portable multiple mobile electronic device charging station 100 is intended to charge mobile devices simultaneously, or individually. In one embodiment, portable charging station 100 comprises a rectangular-shaped housing 101 configured with one or more of an internal divider plate 102 that bisects the inner chamber of the housing 101; one or more removable rechargeable battery packs 103 comprising a plurality of rechargeable battery cells 104; a first access panel with cover 105; a second panel with cover 106 oriented perpendicular to the horizontal access panel 105, the access panels of dimensions commensurate with the battery packs in order to permit movement of the battery packs in and out of the housing 101 through the access panels; a charging board 107 configured as a charge and cell balancing circuit board configured with a plurality of USB ports and device connectors; a plurality of cord cartridges 109 each configured with a retractable charging cord comprising a device connector end 110 protruding from a top face of the cord cartridge 109 and a USB connector end 112 protruding from a bottom face of the cord cartridge 109, and wherein the cartridge 109 houses a retractable charging cord wound around a retractable spool member arranged within the cord cartridge 109; a faceplate (interface) 114 configured with a plurality of openings through which the device connector ends 110 traverse, held in place by retainers 113 that reside on the upper surface of the faceplate when the charging station is fully assembled, the faceplate 114 also configured with port openings 116 for one or more USB ports 115, the USB ports disposed beneath the surface of faceplate 114 and in turn connected to the charge board (not shown); display indicator 118 configured to display a battery charge level; and a flip lid 117 that covers upper face of housing 101, providing a protective covering of the device connectors 110. Each device connector 110 may be any connector adapted for connection with a mobile electronic device. Each device connector 110 may be a USB compatible device connector, for example each device connector may be independently selected from a lightning connector, micro USB connector (e.g. micro-USB A, micro-USB B, or micro-USB 3.0), mini USB connector (e.g. USB mini-b (5 pin), or USB mini-b (4 pin). A device connecting end 110 may also be referred to as a device connector. In another embodiment, cord housing 101 comprises one or more cord ports 119 that permit the charge cord to be extended from the charge station and used to charge a portable electronic device when the lid is closed. Cord ports 119 may be of various sizes, but must be large enough to accommodate the width of one or more charge cords that are extended, and or retracted. In FIG. 1, cord ports 119 are shown as depressions along the upper rim of cord housing 101, the depression along the upper rim is deep enough to accommodate the width of at least one extended charge cord.

Figure 2:
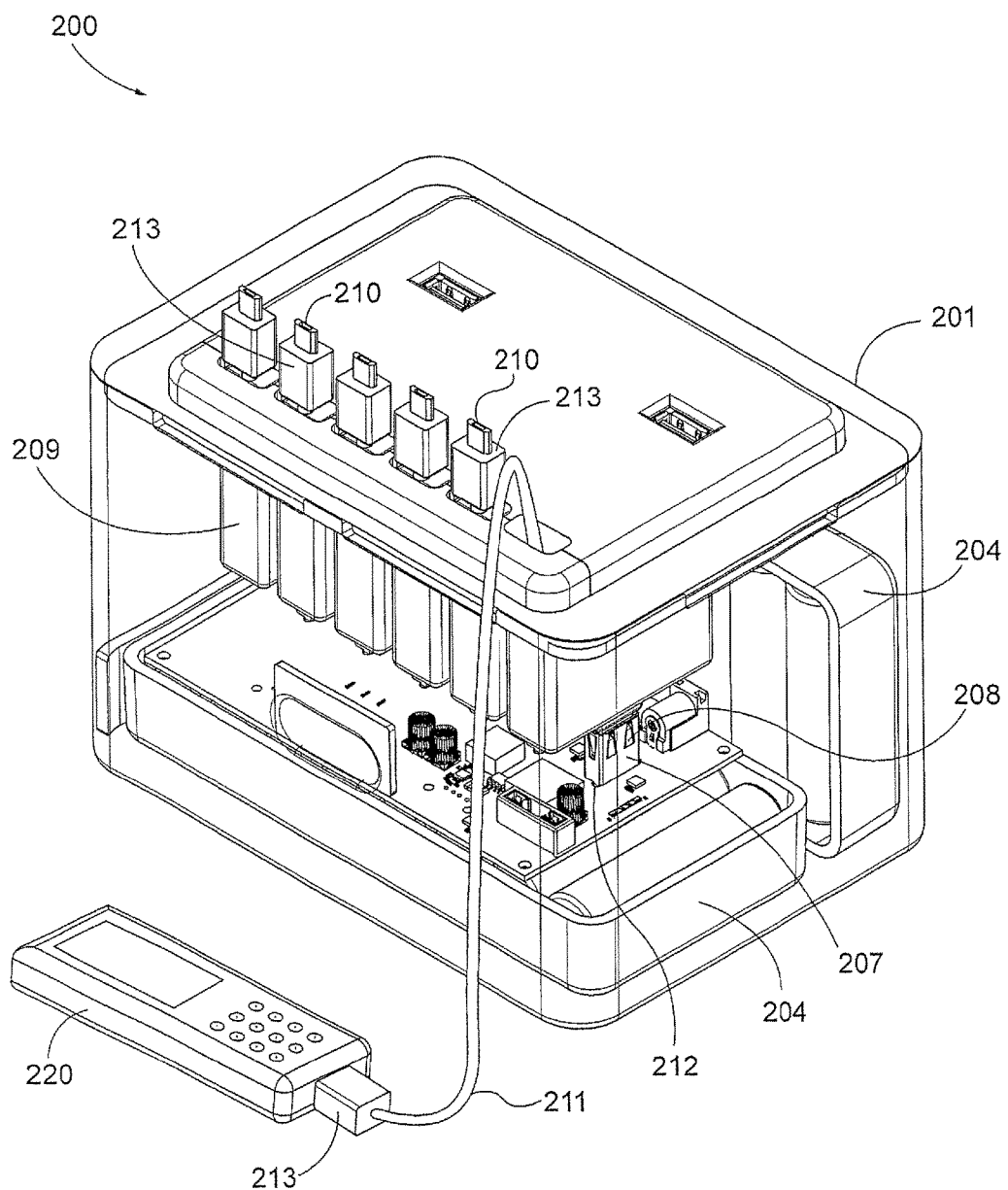
FIG. 2 shows a front side view showing an embodiment of the present invention in use with a portable electronic device.

FIG. 2 shows a front side view of charging station 200, represented as transparent in order to show an internal view of one of several possible arrangements of battery packs 204, charging board 207, charging cartridges 209 are shown aligned within housing 201 of charging station 200. Visible is a USB connector end 212 of charging cartridge 209 connected to USB port 208 of charging board 207. Device end 210 of retractable charging cord is shown on the outer side of faceplate 212, with the retractable charging cord 211 held in position and kept from retracting into the cartridge by retainer 213, shown in the figures as a cube shaped attachment that is of a greater size that the opening of the cartridge, in order to prevent the cord from retracting inward into the cartridge interior. In one embodiment, a charging cord is used to charge a mobile device 220 by engaging device end 210 of charging cord with the receiving end (such as a port for a lighting adapter, for example) of device 220. While a mobile phone is shown attached to charging station in the figure, it should be understood that many types of devices may be connected for charging, provided that the corresponding device connector end is adapted to the device. The devices may be devices that are compatible with USB charging standards. Examples of devices include, but are not limited to, mobile telephones (e.g. iphones, android phones, blackberries) tablets (e.g. ipads), laptop computers, wearable devices, and other similar devices as they may be designed.

Figure 3:
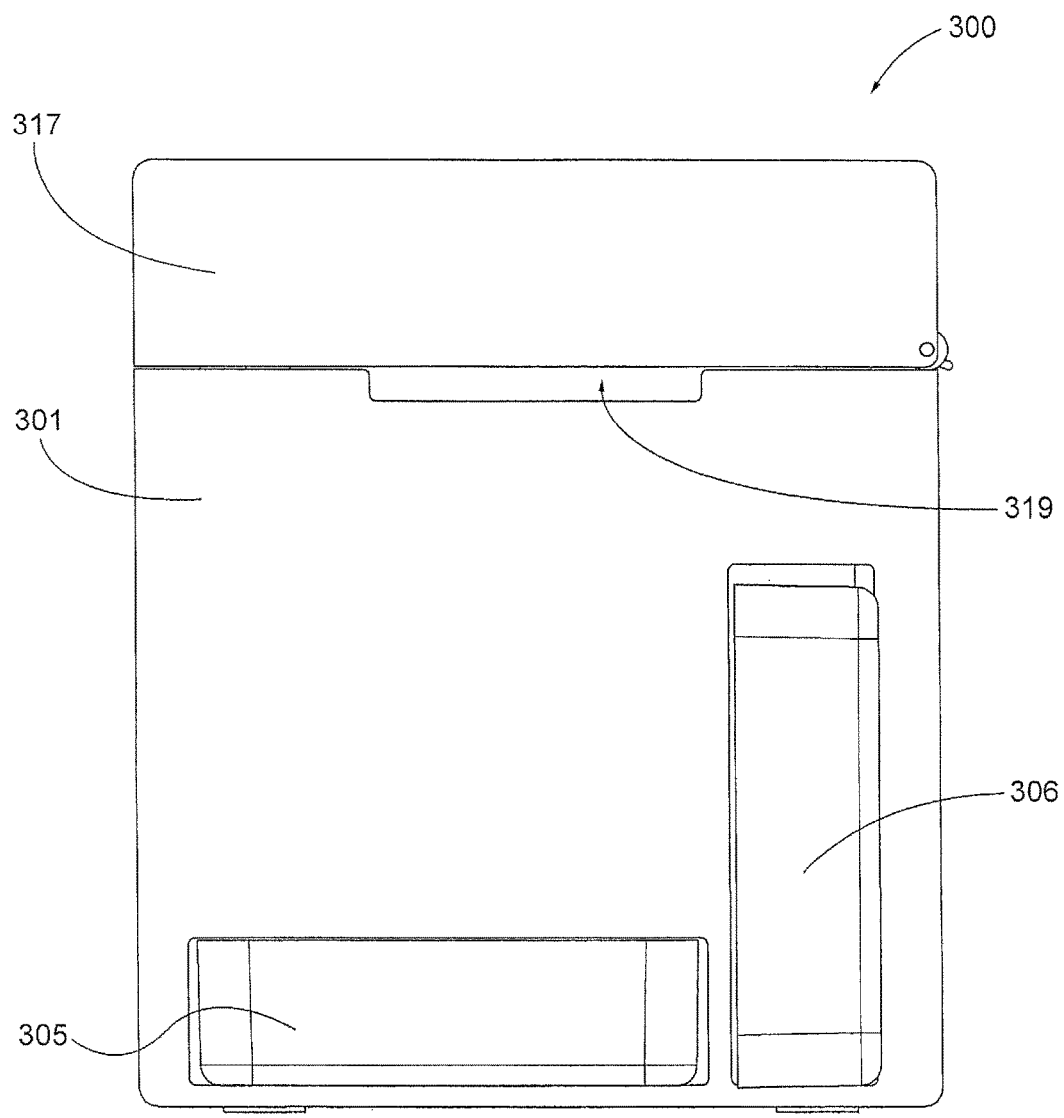
FIG. 3 shows a side view of the charging station according to one embodiment of the present invention.

FIG. 3 shows a side view of a charging station 300 according to one embodiment of the present invention. In one embodiment, battery packs are removable from housing 301 via access panels 305 and 306. Battery packs may align within the housing 301 in various orientations. For example, while the figure shows the battery packs as being aligned vertically and horizontally in the housing, other arrangements are envisioned. Furthermore, a single battery pack may be used, or multiples. In another embodiment, one or more connecting wires connect the rechargeable battery to the charging board. Also shown are housing 301, lid 317 and cord ports 319 ("closed" position of the charging station). The lid and housing are connected by a hinged arrangement, which may comprise a connector pin or other mechanism, such as a magnetic or snap closure.

Figure 4:
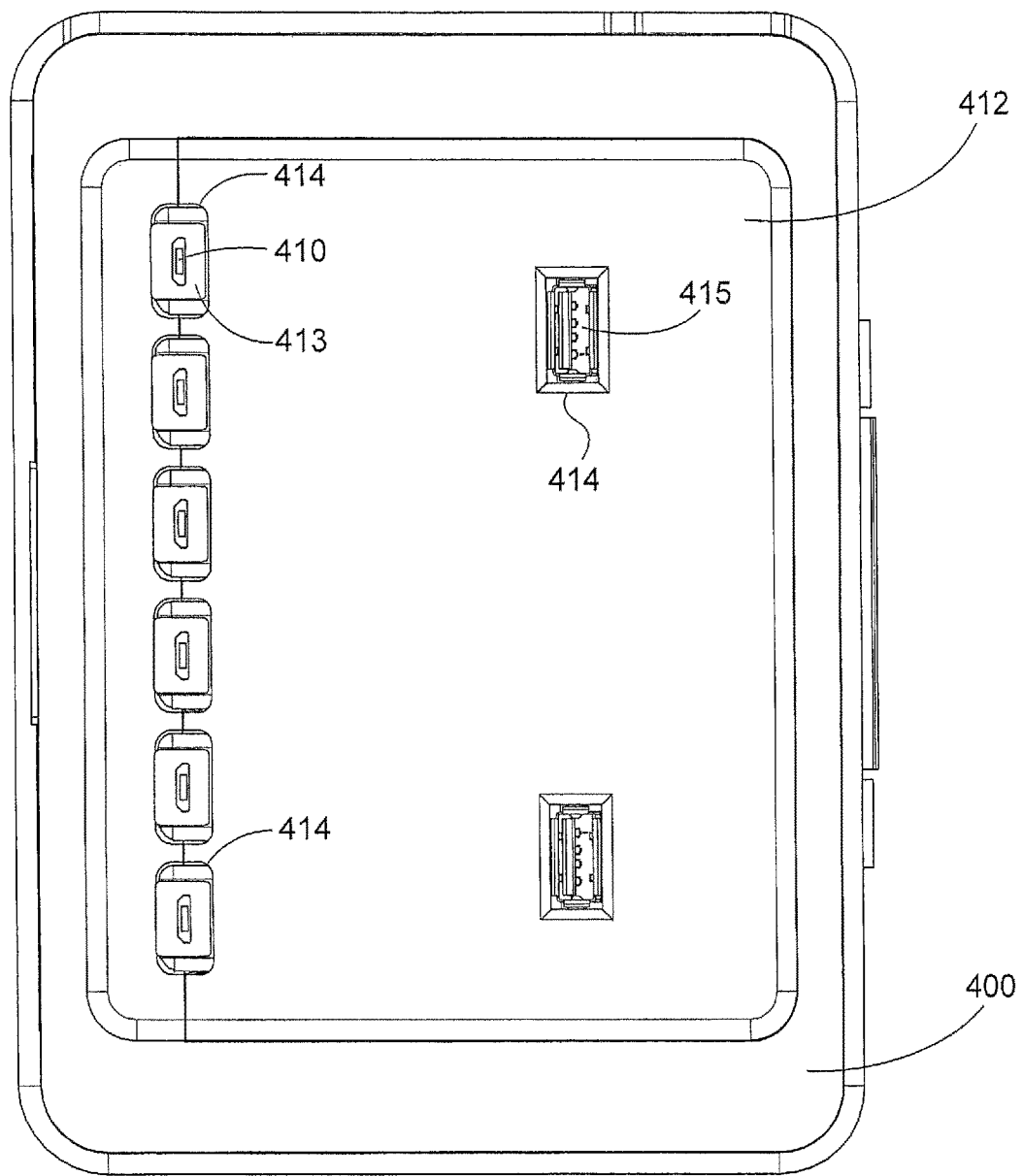
FIG. 4 shows a top view of an embodiment of the present invention to show the arrangement of charging ports on the upper surface of charging station.

FIG. 4 shows detail of faceplate (interface) 412, configured with openings that expose device end 410 of one or more charging cables disposed on upper surface of charging station 400. In one arrangement, device connecting end 410 protrudes through opening 414 in faceplate 412, and is held in position by retainer 413. Face plate 412 may also be configured with one or more USB ports 415. While the arrangement of FIG. 4 shows six (6) device ends and two USB ports arranged in linear fashion along faceplate 412, it will be understood that this is one possible arrangement (and number of connectors) of many possible arrangements. The arrangement shown here is illustrative and not intended to be exhaustive. In another embodiment, device connecting end 410 of charging cord are shown in the figure as adapted for an iPhone, although this feature is not limiting. Each device connector 410 may be a USB compatible device connector, for example each device connector may be independently selected from a lightning connector, micro USB connector (e.g. micro-USB A, micro-USB B, or micro-USB 3.0), mini USB connector (e.g. USB mini-b (5 pin), or USB mini-b (4 pin). In one embodiment, device ends 410 comprise ends adapted to fit one or more devices, such as iPhone, or android devices—or a combination thereof, and may also accommodate adapters as they evolve for various portable electronic devices.

Figure 5:
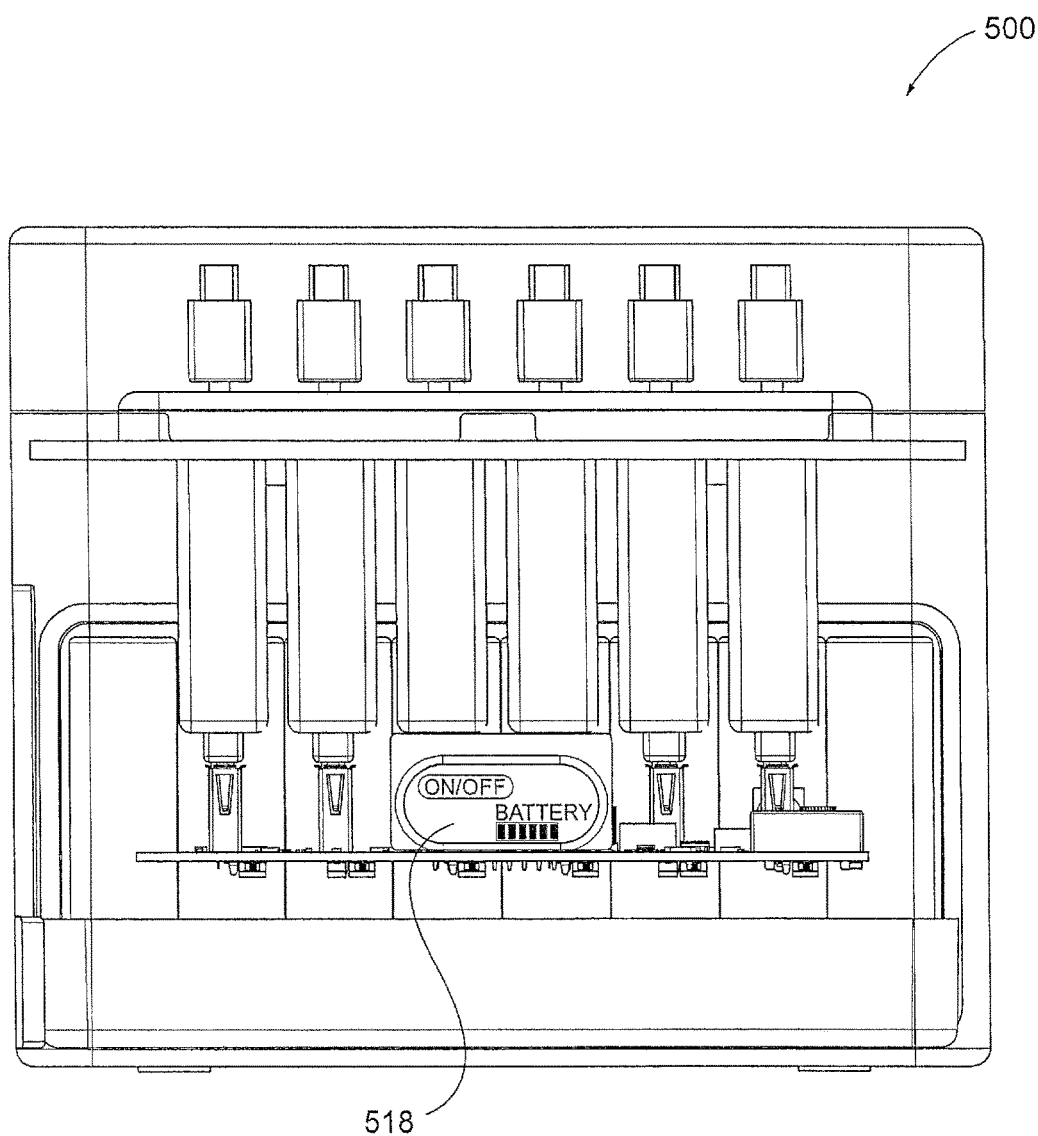
FIG. 5 shows a (transparent) front view of the charging station according to one embodiment of the present invention to show the internal arrangement of charge cord cartridges coupled to charge board.

FIG. 5 shows a front view of charging station 500 according to one embodiment of the invention, comprising a display panel 518 comprising an LED or other display screen configured to display a power status and/or a battery charge level. In another embodiment, the display is configured with a power mode configured with an inactive mode or an active mode. In yet another embodiment, the display panel comprises a touch screen comprising means for initiating a device "on/off" state. In one embodiment, display connects to charging board, either by direct connection or by a wired connection.

Figure 6:
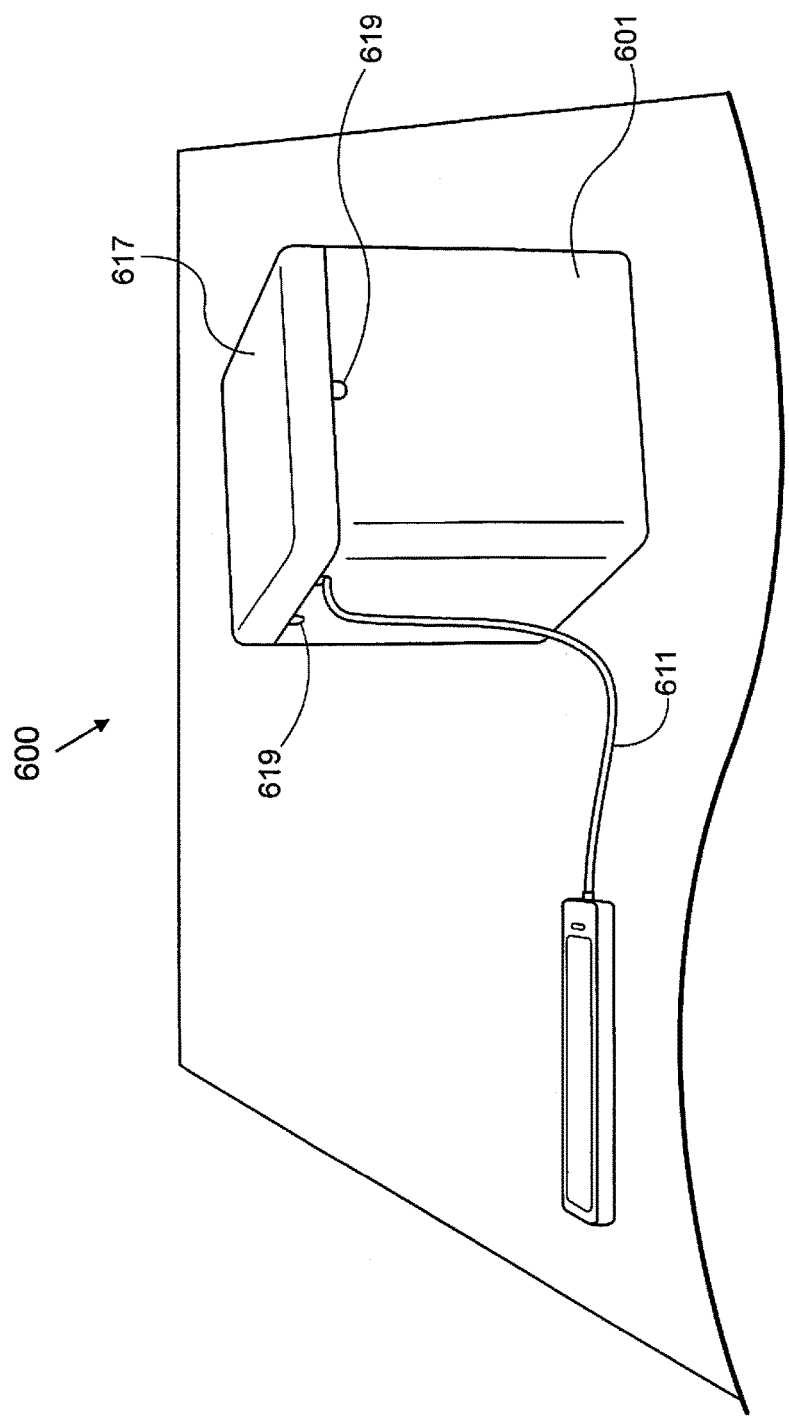
FIG. 6 shows front side view showing an embodiment of the present invention in use with a portable electronic device.

FIG. 6 shows a view of a charging station 600 according to another embodiment of the invention wherein housing 601 comprises cord ports 619 configured as semi-circular depressions along the upper edge of the housing 601, which permit a retracted charge cord 611 (shown extending from the interior of the charge station, through the charge port, to the exterior of the charge station and attached to a portable electronic device) to be used while the lid 617 is in a closed position.

Figure 7:
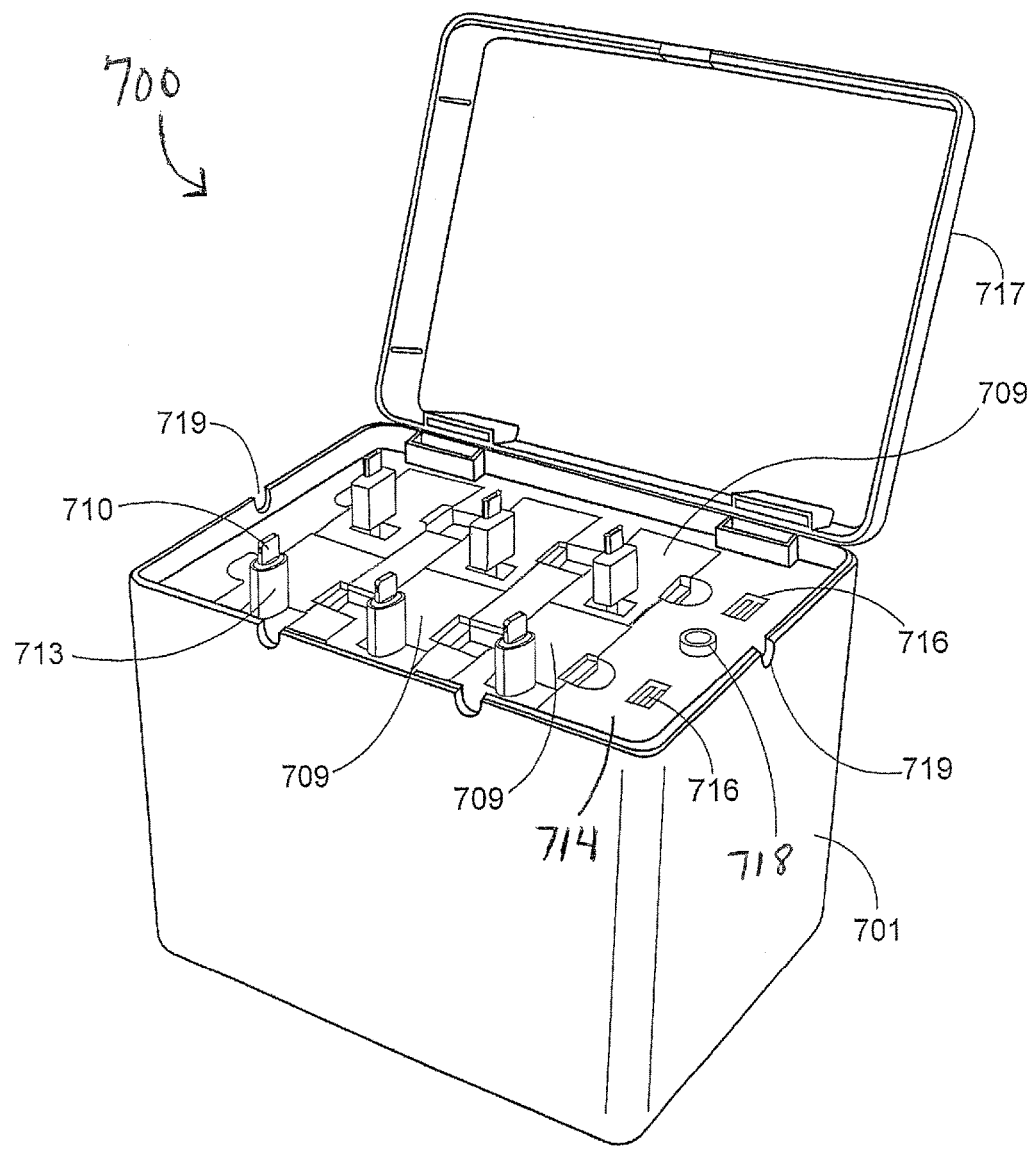
FIG. 7 shows a top view of an embodiment of the present invention to show the arrangement of removable charging ports on the upper surface of charging station.

FIG. 7 shows a view of a charging station 700 according to another embodiment of the invention, comprising charging station 700 configured with a plurality of removable charge cartridges 709 (shown in the FIG. with 6 cartridges) configured for removal from housing 701, the charge cartridges comprising a device connecting end 710 of charging cable that protrudes from the cartridge 709 housing (retractable cord held in position by retainer 713) and a charge connecting end adapted for reversible attachment (plug-in) to the charge station charge board (not shown in Figure). Device connector end 710 can be extended from the cartridge 709 for use in charging an ancillary portable electronic device, and retracted back into position in the cartridge 709 when not in use (a plurality of device connecting ends 710 are shown). Charging station 700 also comprises an on/off power button 718 on the surface of faceplate 714, and one or more USB ports 716 oriented near the top area of housing 701 just beneath faceplate 714. Charging station also is also shown with cord ports 719 positioned along the upper edge of housing 701, in order to provide passage of the charging cord from the interior of the charging station to the exterior for use when the lid 717 of charging station 700 is closed.

Figure 8A:
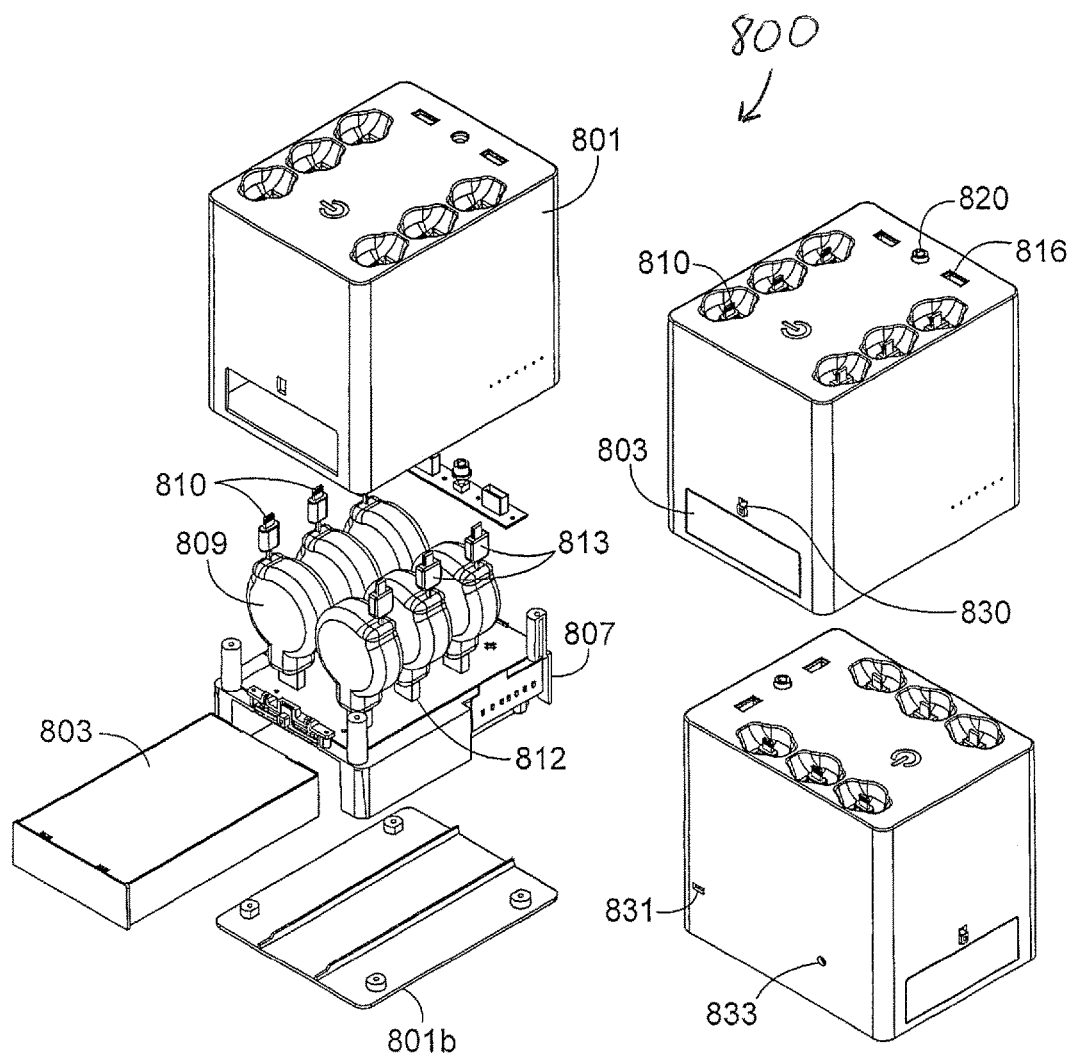
FIG. 8A & 8B show an exploded view diagram showing a charging station according to one embodiment of the present invention and a front side view of the charging station according to one embodiment of the present invention.
Figure 8B:
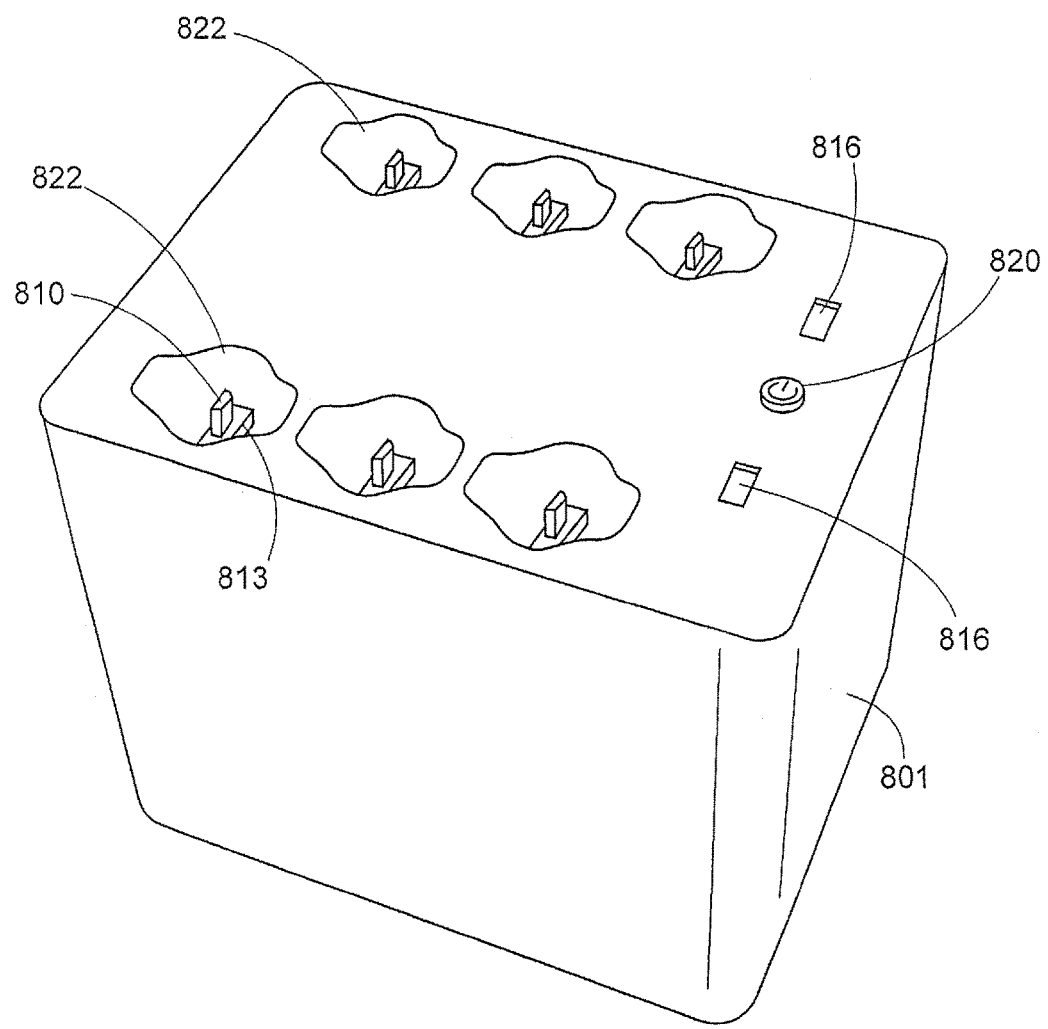

FIG. 8A shows an exploded view of a charging station 800 according to one embodiment of the present invention comprising a housing 801 configured with four side walls and a upper face configured with a plurality of openings for device connectors and one or more USB ports, the housing 801 having a detachable bottom wall 801b configured with attachment means for reversible attachment to the housing 801; one or more battery packs 803; a charge board 807; a plurality of removable and interchangeable charge cartridges 809 each comprising a retractable charge cord windably attached with a spool mechanism (not shown), the charge cord having a charge board connector end 812 for plugging into charge board 807, and a device connector end 810, the device connector end 810 configured, when assembled, with the device connector end 810 positioned on the upper outward surface of the upper face of housing 801, each charging cord held in position by cord retainer 813; one or more USB ports 816 positioned along the upper outward surface of the upper face of housing 801; one or more access panels for battery 803; a power switch 820; one or more indicators, such as a battery replacement switch 830, a power indicator; security feature, such as a security lock feature 831 for retaining the retractable cords in the charging station housing; and a DC input jack 833 for an additional power source. FIG. 8B shows an alternate view of the charging station 800 of FIG. 8A, as a fully assembled unit comprising a plurality of device connectors 810 retrievably positioned along upper surface within openings 822, the openings 822 formed of depressions along the upper surface of the charging station housing 801 and held in position by retainers 813, which are of a size larger than the base of openings 822. Also shown are USB ports 816 and a power on/off switch 820.

Figure 9A:
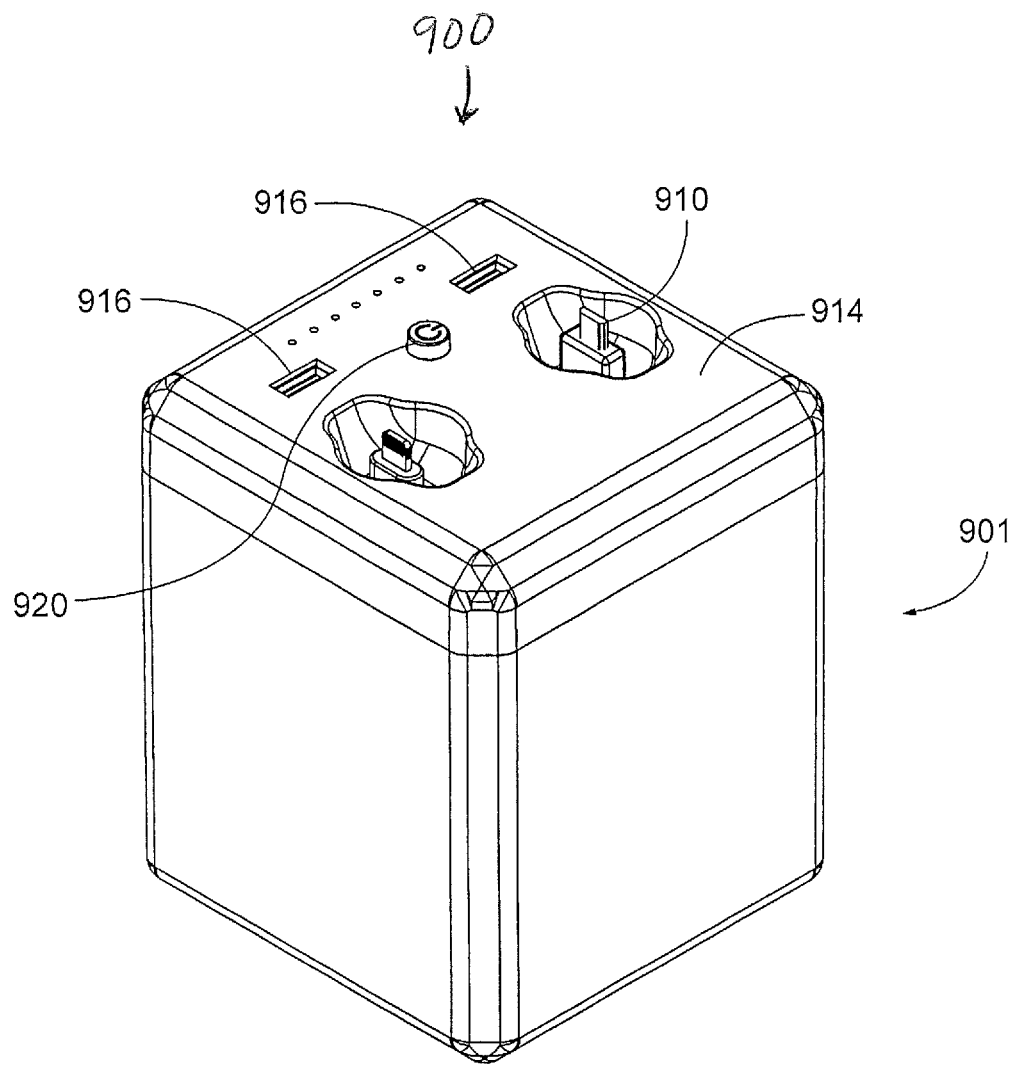
FIG. 9A & 9B shows a front side view of the charging station according to one embodiment of the present invention and a top view of the charging station according to one embodiment of the present invention, including an optional (and removable) protective outer shell encasing charging station housing.
Figure 9B:
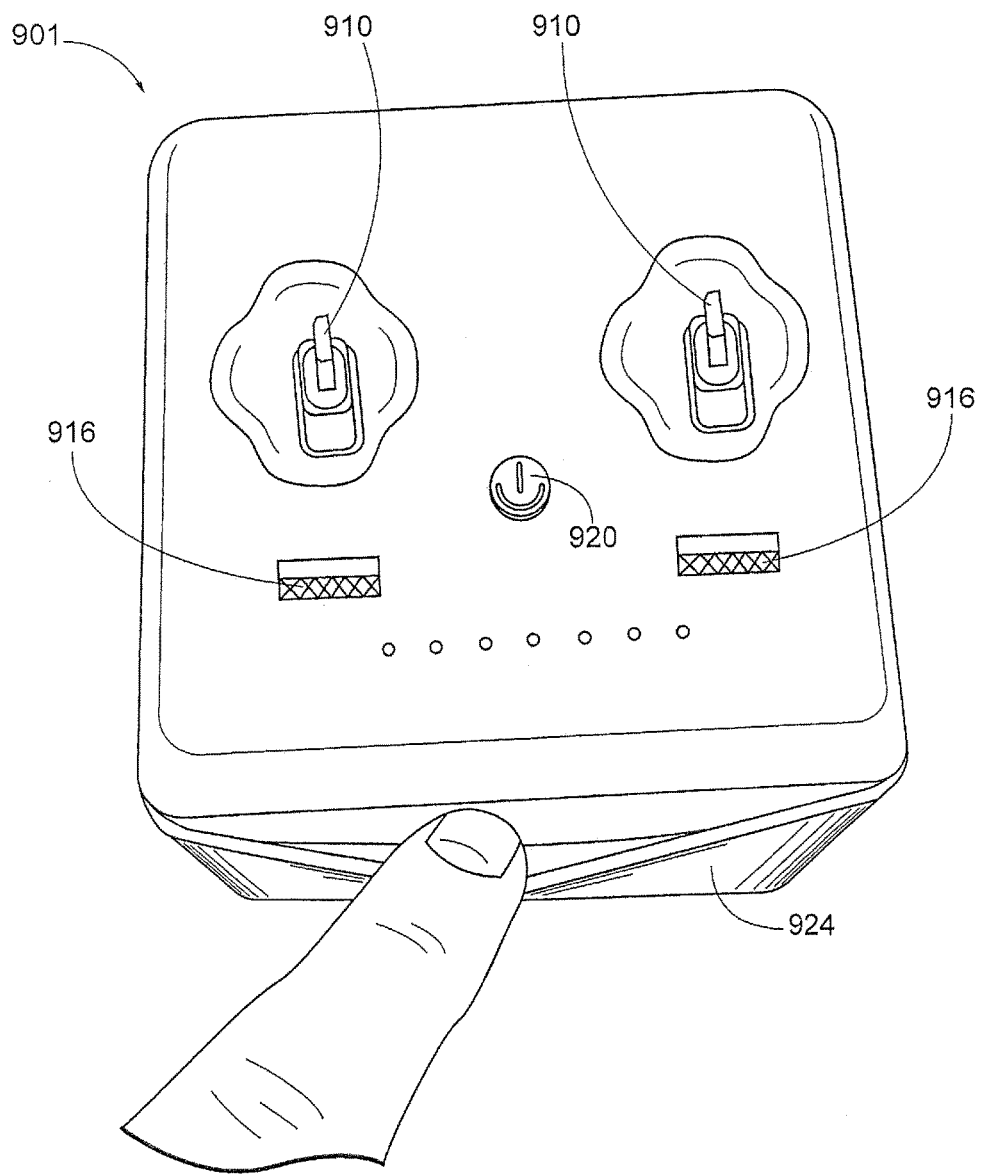

FIG. 9A and 9B shows a charging station 900 according to another embodiment of the invention, comprising a housing 901, dual slot USB ports 916, dual retractable charging cords comprising device connector ends 910 protruding from upper surface of the faceplate 914 of housing 901, an on/off power button 920, wherein the USB ports 916, dual retractable charge cords, and an outer layer 924 that covers all or a portion of the housing 901. In one embodiment, outer layer 924 is a protective layer or "shell", comprised of one or more natural of synthetic materials that provides a protective barrier to the housing 901 and inner components (not shown). The outer layer may be comprised of material(s) suitable as shock-absorbing material, in order to protect the device if dropped, or subjected to other forces of impact. In another embodiment, outer layer 924 is comprised of materials that provide water resistance. In yet another embodiment, the outer layer 924 further comprises one or more advertisements printed or affixed thereto, such as to the outward facing surface of the protective layer; alternatively, the advertisement may be applied as a separate layer, such as a silk wrap or adhesive layer, to the outer layer. While the protective shell outer layer 924 is shown in reference to FIG. 9B, it should be understood that the protective shell outer layer is an optional feature of the charging station that applies to all variations of the charging station presented herein and by the drawings of FIGS. 1-9, inclusive.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A portable charging station for multiple mobile electronic
    devices comprising:
    a rectangular shaped housing;
    one or more removable battery packs;
    a main charging board configured as a charge and cell balancing circuit board located within the housing, the circuit board comprising a plurality of USB ports, and connected to the one or more removable battery packs;
    a plurality of cord housing cartridges comprising retractable charging cords, each of the retractable charging cords having a USB connector end for connecting to the charge and cell balancing circuit board and a device connector end for connecting to a mobile electronic device; and
    a faceplate configured with one or more USB ports for receiving a USB-enabled charging cord, and a plurality of openings for accessing the retractable charging cords from the device connector ends;
    wherein each of the cord housing cartridges comprises a casing configured with a cord spool for retracting the retractable charging cords, each cord spool comprising a spool around which one of the retractable charging cords is wound as its device connector end retracts and unwound as its device connector end extends.

2. The portable charging station of claim 1, wherein the one or more removable battery packs are rechargeable.

3. The portable charging station of claim 1, wherein the plurality of charging cords are configured to enable charging of connected electronic devices from the charging station simultaneously at up to $5V_{DC}$ per device.

4. The portable charging station of claim 1, wherein the device connector end of the retractable charging cord is extendable from the from the spool for a distance of up to four feet or up to three feet or up to two feet.

5. The portable charging station of claim 1, further comprising one or more access panels in the housing, wherein each access panel is configured to permit insertion and removal of at least one of the removable battery packs through the housing.

6. The portable charging station of claim 1, further comprising a housing configured with a flip lid.

7. The portable charging station of claim 1, further comprising at least one advertising message adhered or placed as a wrap or silk screen on the exterior of the housing of the charging station.

8. A portable charging station for multiple mobile electronic devices comprising:
 a rectangular shaped housing;
 a power source located within the housing, the power source comprising one or more battery packs;
 a charging board located within the housing, the charging board configured as a charge and cell balancing circuit board and comprising a plurality of USB ports;
 a plurality of removable cord housing cartridges comprising retractable charging cords, the charging cords having a charging board connector end for connecting to the charge and cell balancing circuit board and a retractable device connector end for connecting to a mobile electronic device; and
 a faceplate configured with a plurality of openings from which retrievable device connector ends protrude, thereby enabling connection of multiple electronic devices to the charging station;
 wherein each of the cord housing cartridges comprises a casing configured with a cord spool for retracting the retractable charging cords, each cord spool comprising a spool around which one of the retractable charging cords is wound as its device connector end retracts and unwound as its device connector end extends.

9. The charging station of claim 8, the faceplate further comprising one or more USB ports for receiving a USB-enabled cord.

10. A method of charging at least one mobile electronic device comprising connecting the at least one mobile electronic device to a retractable device connector end of a retractable charging cord cable of a portable charging station according to claim 1 or claim 8.

* * * * *